United States Patent [19]

Kaiser

[11] 4,214,263

[45] Jul. 22, 1980

[54] TELEVISION SYSTEM FOR DISPLAYING AND RECORDING PATHS OF MOTION

[75] Inventor: Arthur Kaiser, Trumbull, Conn.

[73] Assignee: CBS Inc., New York, N.Y.

[21] Appl. No.: 944,236

[22] Filed: Sep. 20, 1978

[51] Int. Cl.[2] .................... H04N 5/22; H04N 7/18; H04N 5/22

[52] U.S. Cl. .................................. 358/22; 358/105; 358/183

[58] Field of Search ................. 358/13, 22, 105, 133, 358/136, 36, 181–183, 185; 273/DIG. 28

[56] References Cited

U.S. PATENT DOCUMENTS

| | | |
|---|---|---|
| 3,851,096 | 11/1974 | Collins et al. ...................... 358/105 |
| 4,005,261 | 1/1977 | Sato et al. ............... 273/DIG. 28 X |
| 4,025,718 | 5/1977 | Paretti .............................. 358/105 X |
| 4,026,555 | 5/1977 | Kirschner et al. ...... 273/DIG. 28 X |
| 4,064,530 | 12/1977 | Kaiser et al. ............................ 358/36 |
| 4,090,221 | 5/1978 | Connor ................................. 358/105 |
| 4,168,510 | 9/1979 | Kaiser .............................. 358/105 X |

Primary Examiner—James W. Moffitt
Assistant Examiner—Aristotelis M. Psitos
Attorney, Agent, or Firm—Spencer E. Olson

[57] ABSTRACT

In television apparatus for producing signals for displaying simultaneously a succession of time-separated images of an object moving over a selectable time period in an otherwise static scene, the effect of the display is improved, particularly in situations where there is partial overlap of successive images of the object, by causing the latest image of the moving object to take precedence over the next previous image.

16 Claims, 5 Drawing Figures

TELEVISION SYSTEM FOR DISPLAYING AND RECORDING PATHS OF MOTION

BACKGROUND OF THE INVENTION

This invention relates to television apparatus, and more particularly, to a system for providing a television display which portrays the path of motion of a moving object in an otherwise static scene.

In commonly assigned application Ser. No. 864,405 filed Dec. 27, 1977, entitled "Television System for Displaying and Recording Paths of Motion," there is described a system for providing a television display which portrays the motion of an object in a scene during a specific time interval such that, in addition to its present position being shown, a plurality of earlier positions commencing with the start of the time interval, are also depicted. The system includes a storage device capable of storing one television frame and adapted to accept substitute information concerning individual picture elements of the television signals stored therein in combination with means for comparing the stored television frame with selected subsequently arriving frames. Upon detection of differences between corresponding picture elements of the stored and subsequently arriving frames, signifying motion, the picture elements that caused the detected difference are substituted for corresponding picture elements in the stored frame, and the fact of each such substitution is stored or otherwise indicated. The system is arranged to preclude another substitution of previously substituted picture elements in the stored frame. The frequency of the comparisons, that is, the number of incoming television frames between successive comparisons, is controllable and determines the spacing in the display between successive positions of the moving object.

Although the system of the copending application provides an acceptable display of successive positions of the moving object when the subsequently arriving frames selected for comparison with the stored frame are spaced sufficiently that successive images of the moving object are not contiguous or overlapping, in situations where it is desired to display the total motion of a person, swinging a golf club, for example, if there is any tendency for overlap between successive images (e.g., the person's arms), the latest image is partially occluded because the system gives precedence to the earlier images.

The reasons for this sometimes undesirable characteristic of the earlier system will be seen from analysis of the operation of the system illustrated in FIG. 1 (which corresponds to FIG. 2 of the aforementioned co-pending application). The earlier system includes a pair of multiplexers 14 and 16 each having two inputs designated a and b, and a control terminal c which when enabled is operative to select which of the two inputs is coupled to its output terminal d, a comparator 18, and a switch 20 having an open position R and a closed position S. The incoming video signal is applied to one input terminal of comparator 18 and also to the lower input terminal b of multiplexer 16. The output terminal d of multiplexer 16 is connected to the lower input terminal b of multiplexer 14, and when switch 20 is in the "S" position, is also connected to the input of update frame delay 12, the output of which is connected to the upper input terminal a of multiplexer 16. The output terminal d of multiplexer 14 is connected to the input of reference frame delay 10, the output of which is connected to the upper input terminal a of multiplexer 14, and also to the second input terminal of comparator 18. A control signal at terminal 22 is applied to the control terminal c of both multiplexers and causes them both simultaneously to select either the signal appearing at input terminal a or at the lower input terminal b. Because of the common control of the two multiplexers, all of the update information, representing successive positions of the moving object, is eventually transferred into the reference frame delay 10 and, in one mode of operation, upon operating a "stop" button at the end of the selected "action interval," is coupled to the output along with the reference frame.

Because the c controls of multiplexers 14 and 16 are ganged together, making them operative simultaneously at all times, the reference frame delay 10, which provides one input to comparator 18, is not an immutable reference against which to compare the incoming video signal. That is, although reference frame delay 10 initially contains only the reference background, as the moving object progresses across the scene information concerning the moving object is accumulated in the reference frame; the information concerning the moving object added to the reference frame delay causes the initial "clean" condition to be obscured. The result is that if successive images of the moving object have overlap, the earlier image will effectively lock out the later image from the same portion of the raster because the signal Z will be a "1" which, according to the logic of the prior system, will preclude transferring to the reference frame update information concerning the overlapping portion of the later image. The effect on the displayed image is illustrated in the upper portion of FIG. 2, which depicts successive overlapping images of a ball moving from left to right. It will be seen that in all of the successive positions, the earlier image takes precedence over the next successive image, obscuring the next successive image in the area of overlap, an undesirable result from the viewer's point of view.

SUMMARY OF THE INVENTION

The primary object of the present invention is to improve the viewability of a television display of the kind described above, particularly in situations in which there is overlap of successive images of the object whose motion is to be portrayed, by giving priority to signal information concerning the latest image of the moving object.

Briefly, this object is achieved by a system similar to that of the aforementioned copending application in that it includes a reference frame delay, an update frame delay, a comparator, and a pair of multiplexers, except that the two multiplexers are independently controlled in such a way that update information is not inserted in the reference frame delay during the "action interval," thus to retain the integrity of the initially stored reference frame. More particularly, the separate controls are arranged to allow capture of a reference frame at the start of the "action interval," and to preclude information from being written into the reference frame delay during such interval, and following capture of the reference frame, to accumulate update information in the update frame delay resulting from comparisons of the immutable reference frame with selected subsequently arriving frames. The result is that earlier update information cannot obscure later update information; that is, the latest update information takes precedence over earlier update information. At the termination of the action interval, the accumulated update information may be combined with the initial reference frame and coupled to the output for display, or alternatively and preferably in many situations, the accumulated update information may be added to the frame existing at the end of the action interval.

BRIEF DESCRIPTION OF THE DRAWINGS

Other objects, features and advantages of the invention will become apparent, and its construction and operation better understood, from the following detailed description, taken in conjunction with the accompanying drawings, in which.

DESCRIPTION OF THE INVENTION

The general function of the present invention, like the system described in the aforementioned copending application, is to store and display the past history of moving objects in a scene so that the path of the moving object can be viewed. In essence, at the moment in time at which it is desired to display and record a motion path, say, at the moment of impact of a putter on a golf ball, the operator initiates the system to store at this moment a single frame of video. This stored reference frame is utilized throughout the interval during which motion of the ball is significant to provide a frame of reference against which to determine which elements of the scene have been in motion, in this example, the follow-through of the putter and the motion of the ball toward the cup. Every picture element of the stored reference frame is periodically compared with corresponding picture elements of video subsequently applied to the system, and due to the motion of the ball (or other object) in an otherwise static scene, this comparison creates a difference signal, successive ones of which, representative of successive new ball positions, are stored in a suitable storage device. If the camera is held stationary during the time required for the ball to travel from its initial rest position to a point at which it stops, all background information of the scene will have been static and thus would produce no difference signal. The difference signals caused by motion are added to a selected full frame to produce a "freeze" frame having multiple positions of the ball displayed thereon, which trace its motion path.

Figure 1:
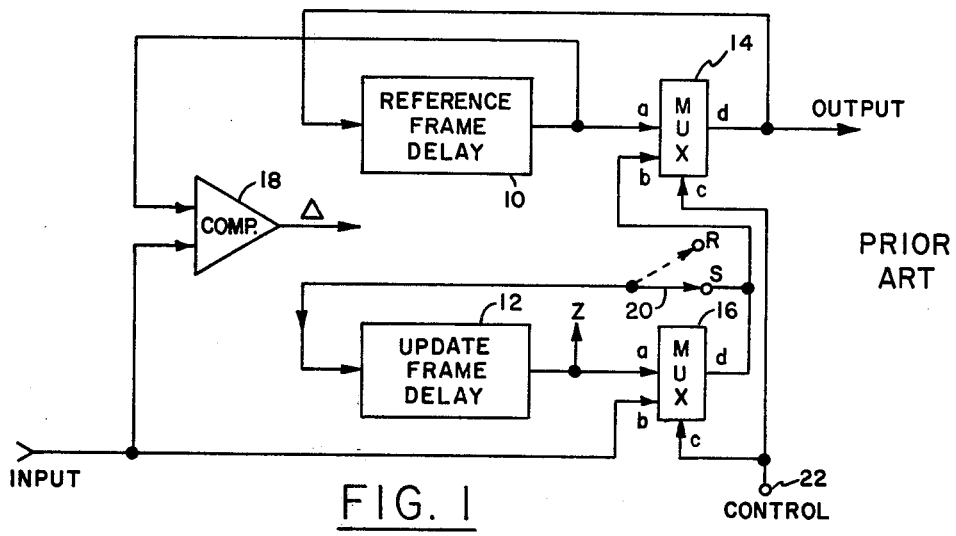
FIG. 1 is a functional block diagram of the system described in the aforementioned copending application, to which reference has already been made.
Figure 3:
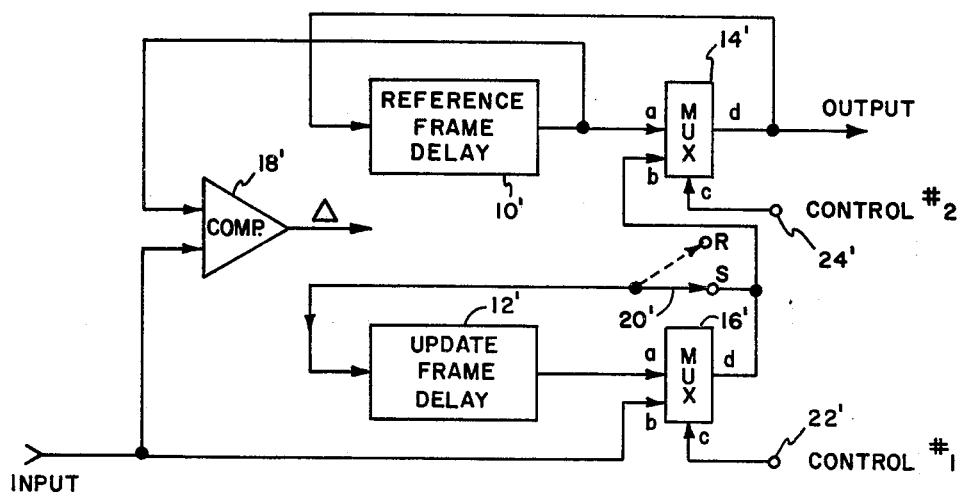
FIG. 3 is a functional block diagram of a motion display system embodying the present invention.

Unlike the specific embodiment described in the aforesaid copending application in which the earlier image of the moving object takes precedence over the next successive image, resulting in partially obscuring the later image should the images overlap, the present system gives priority to signal information concerning the latest image of the moving object thereby to improve the viewability of the final display. The fundamental system for achieving this improved performance is illustrated in FIG. 3, being similar in many respects to the system of FIG. 1 in that it includes a reference frame delay 10', an update frame delay 12', a pair of multiplexers 14' and 16' each having two inputs, designated a and b, and a control terminal c, which when enabled is operative to select which of the two inputs is coupled to its output terminal d, and a switch 20' having an open position "R" and a closed position "S". The incoming video signal, from a color television camera, for example, is applied to one input terminal of comparator 18' and also to the lower input terminal b of multiplexer 16'. The output terminal d of multiplexer 16' is connected to the lower input terminal b of multiplexer 14', and when switch 20' is in the closed or "S" position, is also connected to the input of update frame delay 12', the output of which is connected to the upper input terminal a of multiplexer 16'. The output terminal d of multiplexer 14' is connected to the input of reference frame delay 10', the output of which is connected to the upper input terminal a of multiplexer 14', and also to the second input terminal of comparator 18'. A control signal, designated "Control #1", at terminal 22' is applied to the control terminal c of multiplexer 16', and a second control signal, designated "Control #2", at terminal 24', is applied to the control terminal c of multiplexer 14'. The multiplexers, which may be any of many that are commercially available, either digital or analog, enable the two frame delays each to be employed in a circulating or sequential reading mode so as to retain, indefinitely, if desired, whatever information is stored therein.

The system has three operational states, namely, a "reset" state in which the system has no effect on the incoming video signal, a "start" state, and a "stop" state. In the "reset" state, switch 20' is in its open, or "R" position, and the control signals applied to the respective control terminal of the two multiplexers are such as to select the signal appearing at the lower input terminal b of both multiplexers. It will be seen that in this state the incoming video is coupled through multiplexers 16' and 14' in tandem to the output terminal of multiplexer 14'. Since switch 20' is open, the incoming video has no effect on update frame delay 12', and although the signal appearing at the output terminal of multiplexer 14' is applied to the input of reference frame delay 10', it does not affect the output signal since the input terminal a of multiplexer 14' is disabled.

When the operator of the system sees the beginning of an action that he wishes to record and ultimately display, he initiates the "start" state, as by pushing a button (not shown), which is operative to close switch 20' to its "S" position and to change the level of the respective control signals at terminals 22' and 24' so that both multiplexers select the signal applied to its a input terminal. The precise time at which the control signals are effective to switch to the upper input terminal of the multiplexers is timed with the vertical sync from the incoming video signal to ensure that the actions of the various elements of the system take place at the start and end of a particular television frame. At the instant of "start," the video frame contained in reference frame delay 10' is captured and recirculated through multiplexer 14' and constitutes a reference frame which is stored throughout the "action interval" between "start" and "stop". Also, update frame delay 12' is totally empty. As used herein the term "recirculating" is not intended to imply the moving or shifting of data through a memory; rather, it merely indicates that memory data is read in a continuing sequential pattern, similar to a raster scan, which can be achieved by a random access memory with sequential addressing, or by a shift register memory with data shifting. The term "delay" as used in the text and drawings is intended to be synonymous with store or memory; the word delay is used because the sequential accessing of the memory data introduces a time delay. Repeating, Control #2 at the instant of "start" switches multiplexer 14' to its a input and holds it there throughout the "action interval". Further writing into 10' is barred for the interval.

This stored reference frame is compared in comparator 18' on a picture element-by-picture element basis with the incoming video signal, the comparator producing an output signal, $\Delta$, whenever there is a finite difference between the stored reference video and the incoming video signal. When the value of $\Delta$ is not zero, the control signal at terminal 22' is altered to select the lower input b to multiplexer 16', thereby coupling to update frame delay 12' update information during the brief interval of time during which $\Delta$ is not zero; when $\Delta$ returns to zero, the control signal at terminal 22' again selects the upper input a to multiplexer 16'. This process continues, with comparisons made between the stored reference frame and selected successive frames of incoming video for so long as the operator wishes to record the track of the moving object, at which time the "stop" state of the system is initiated, as by pushing a "stop" botton (not shown). At this point in time, reference frame delay 10' contains nothing but the original reference frame loaded in at the start of the cycle, and update frame delay 12' contains information representing all of the successive images of the moving object. Upon initiation of the "stop" state, Control #1 selects the upper input a of multiplexer 16', and Control #2 selects upper input a of multiplexer 14', but only after a one-frame interval during which the b input is selected, so that the information contained in update frame delay 12' is added to the reference frame, replacing the picture elements thereof in positions represented by the update information, to produce at the output d of multiplexer 14' the stored reference frame with the update information inserted therein.

It will have been noted that certain logic is applied to the control lines 22' and 24' to effect the selection at appropriate times between the upper and lower inputs of the two multiplexers. Although no specific implementation of the required logic is illustrated in FIG. 3, it will be readily apparent to ones skilled in the art how to set up logic circuits to cause the desired mode of operation.

It will be recognized from the foregoing description of a very fundamental form of the system that by basing on $\Delta$ alone the decision as to whether or not update information is to be coupled to update frame delay 12', updating can be made without fear of erasure of non-overlapping previously stored information by activating Control #1. The background scene in the incoming video signal is also always being compared with the original background in the stored reference frame and, accordingly, no $\Delta$ can occur except when there is motion of an object in the static background scene. The update information is not added to the reference frame delay 10', but is added only to update frame delay 12' where, if it becomes necessary, update information can be superimposed on older update information. Since the reference frame delay 10' is locked out from new loadings throughout the period from "start" to "stop", it is unnecessary to tag the information loaded into frame delay 12'; that is, there need be no concern about erasures of update information, except as required to prevent occlusion of later updates. The latter requirement takes care of itself since the most recent image of a moving object is always compared with the reference background; that is, the reappearance of background behind a moving ball, for example, is only compared with itself in the reference store.

Having described a basic functional system for accomplishing the purposes of the invention, namely, to give priority to signal information concerning the latest image of the moving object, a specific embodiment will now be described, with reference to FIG. 4, as applied to NTSC television and implemented in the digital domain. The video input signal on input line 30, from a color television camera, for example, is PCM-encoded, utilizing an 8-bit code, and applied to the lower input terminal b of both of a pair of multiplexers 32 and 34, and also to one input terminal of a comparator 36 labelled "Pixel Compare". The encoded input video signal is also connected to the input of a delay device 54 having a delay of 525H, where H represents one television line interval; thus, the delay device introduces a one-frame delay since there are 525 lines per frame in the NTSC system. The output of delay device 54 is applied as a second input to comparator 36.

The output terminal d of multiplexer 34 is connected to the input of a second delay device 38 having a delay of (525H-$\tau$); again, H represents one television line interval, which means that the delay device introduces a one-frame delay. In a practical system, the delay is actually slightly less than one frame by the period of $\tau$ because of incidental loop delays introduced by other system components in the recirculating loop. In a system which has been successfully operated, both delay devices 38 and 54 take the form of a digital frame store having the capability of storing one pulse-code-modulated video frame. The particular form of the frame store is unimportant, and may be implemented with shift registers, random access memories or any other form of addressable memory, the important consideration being that with digital processing it is possible to achieve essentially unlimited timing accuracy. The output of delay device 38 is applied to a comb filter 40 of known construction synchronized to the local chrominance reference and operative to produce two output signals, a Y+C signal (which essentially corresponds to the input to the comb filter) and a Y+$\overline{C}(t)$ signal, namely, the luminance component plus the chrominance component periodically inverted, i.e. the chrominance inversion occurring as a function of time. More particularly, in one frame the chrominance is inverted, in the next frame it is not, in the next frame it is again inverted, and so on, to ensure that the color subcarrier of the output of frame store 38 will always be in proper phase with the local chrominance reference. The Y+C output signal from comb filter 40 is applied to the upper input a of multiplexer 34, and the Y+$\overline{C}(t)$ output signal from filter 40 is applied to the upper input a of multiplexer 32. The heavy line path from the output terminal of multiplexer 34 through delay device 38, comb filter 40 and back to the upper input a of multiplexer 34 is a recirculating loop for a reference frame stored in delay device 38.

A tag module 42 is provided for the purpose of controlling the insertion of update information into the reference frame stored in the recirculating loop upon detection of motion by comparator 36 between a second reference frame stored in delay device 54 (which initially contains the same reference frame as the circulating loop except that in the latter case the least significant bit of each code word is forced to be zero) and selected frames of incoming video. Essentially, tag module 42 is a logic circuit operative in response to two input signals to provide at appropriate times a control for multiplexer 34 so as to insert up-date information into the recirculating reference frame and to control the write-in and read-out of delay device 54. One of the inputs is a true logic input Δ, produced when a comparison between the frame stored in delay device 54 and a selected incoming frame exceeds an arbitrary threshold level. It is immaterial whether the true logic is positive or negative so long as the logic of tag module 42 is designed to accommodate it. A second input to tag module 42 is applied over line 44 labelled "Operator Control #1", which line is also connected to the control terminal c of multiplexer 34. One output of tag module 42, labelled "Force LSB=1," is connected to the recirculating loop; a signal appearing thereon forces the least significant bit of the 8-bit recirculating encoded signal to equal "1". A second output of tag module 42 applies a "Delta Control" signal to multiplexer 34 which takes over control of multiplexer 34 such that when Δ=1 multiplexer 34 is switched to its b input terminal for receiving update information from the incoming video. A second control line 46, designated "Operator Control #2," is connected to control terminal c of multiplexer 32 and determines whether the operation of the system is to be continuous or strobed, and also serves as the "STOP" control. A control line 48 designated "Sampling Rate Enable" is connected to multiplexer 34 and refers to a logic level determined by the selection by the operator of the rate of motion update, the significance of which will become evident as the description proceeds. Finally, the least significant bit of the encoded signal in the heavy line recirculating loop is coupled via a line 50 to a second control terminal of multiplexer 32 for causing coupling of the stored recirculating reference frame to the system output terminal 52 when multiplexer 32 is properly conditioned by actuation of "Operator Control #2". The logic states of lines 50 and 46 cause multiplexer 32 to switch from the b input to the a input indicating the insertion of prior updates to an otherwise live video signal.

Figure 4:
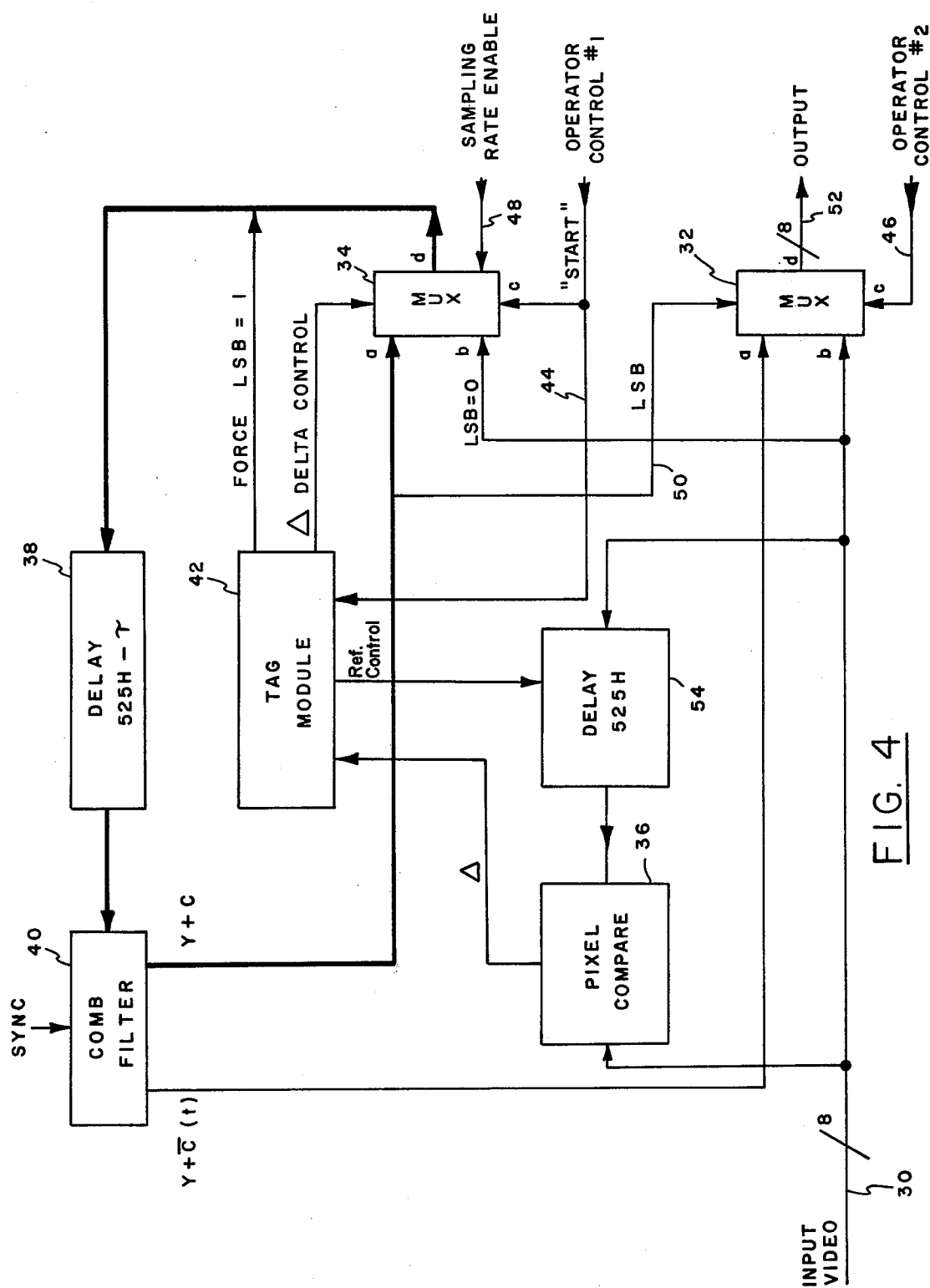
FIG. 4 is a functional block diagram of a specific embodiment of a system for displaying and recording paths of motion in color television.

The system of FIG. 4, like the FIG. 3 system, has three states of operation: "reset," "start" and "stop". In the "reset" state, "start" line 44, the Delta Control line and the "Force LSB=1" line are all false or "off". Because multiplexer 34 selects the input to the recirculating loop, the loop is not recirculating in the "reset" state because its input b is selected and all least significant bits in the incoming video have been made zero. The "stop" line 46 is also false or "off", a condition which selects input terminal b of multiplexer 32, with the consequence that the input video on line 30 is coupled to the output terminal 52 of multiplexer 32.

In the "start" state, the "start" line 44 is true or "on", causing tag module 42 to apply a reference control signal to delay device 54 to permit a reference frame of incoming video to be written into delay device 54. With a true signal on line 44, the logic of tag module 42 causes the Delta Control to take over control of multiplexer 34, and when Δ=1, multiplexer 34 is switched to its b input terminal and causes the "Force LSB=1" line to become true. With input b of multiplexer 34 selected, a reference frame of incoming video with all of its least significant bits equal to zero, is coupled to the output terminal d of multiplexer 34 and into the recirculating loop including delay device 38. Thus, the recirculating loop including delay device 38 contains the same reference frame as delay device 54, but with all of its LSB's=0. Also, the occurrence of a least significant bit equal to "1" on line 50, which is applied to the upper control terminal of multiplexer 32, causes multiplexer 32 to select chroma phase-corrected recirculating updates appearing at its upper input terminal a.

The "stop" state of the system is initiated by operation of "Operator Control #2," which applies a true signal to control terminal c of multiplexer 32 to select only the a input to the multiplexer. At the same time, the "Start" control is forced to be false, disabling the Delta Control, thereby forcing multiplexer 34 to be held in the recirculating mode. Since in this mode multiplexer 34 is selecting the signal at its upper input terminal a, it will continue to recirculate the original reference frame, plus all of the updates that have been added to it during the time period between actuation of the "start" and "stop" controls.

Summarizing, during the "action interval," input video reaches the output via multiplexer 32 which is controlled by LSB (line 50), a logic signal generated by the control logic of tag module 42 from the least significant bit out of the recirculating loop including delay 38. When that bit is a logic "1" the output video is derived from the recirculating loop rather than from the input video. Thus, the output signal available is the live video with the earlier images of any moving objects added. When the action cycle is terminated by the operator, the last sampled field of update video is combined with the earlier stored images in the recirculating loop and retained as a frozen composite frame in the recirculating loop. The output from the recirculating loop is then available as an "instant replay" freeze frame with the action which has occurred during the cycle shown stroboscopically. In the event of motion of individuals during the "action interval," combination of the last field of video with the stored images of the moving object, since the only difference in the last field and one stored at the start of the cycle will be the positions of individuals in the scene, can frequently introduce a human interest aspect to the display, such as jubilation or dejection depending upon the results achieved.

Figure 2:
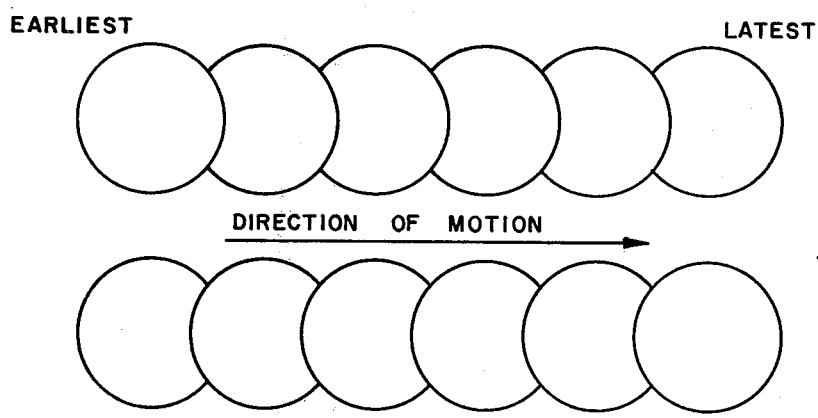
FIG. 2 is a diagram illustrating the effect of image overlap.

It will have been observed that the insertion of update information into the recirculating loop as a result of detected motion between a reference frame and the incoming video is accomplished outside the recirculating loop; that is, the Delta Control, which determines whether and when update video information is to be inserted in the recirculating loop, depends on comparison of the incoming video with an unchanging reference frame stored in delay device 54. Thus, a true Δ signal signifies only motion between the incoming video signal and the reference frame stored in delay device 54, and is not affected by previously inserted update information in the recirculating loop as was the case in the system of the aforementioned co-pending application. Consequently, rather than avoiding the possibility of updated information in the recirculating loop being "erased" by subsequent stored video/incoming video comparisons, should there be overlap of successive images of the moving object, the later image can be superimposed on older update information, thereby giving precedence to the later update information. In other words, precedence is given to the most recent images so that, during image overlap conditions, the more recent information is retained and the earlier overlapped information is replaced. The effect of this on the display is illustrated in the lower half of FIG. 2.

Little has been said thus far about how update information is taken from the input video and added to the recirculating loop without losing chrominance information in the face of the fact that in the NTSC system the phase of the color subcarrier is reversed from frame to frame. It is essential, therefore, that the phase of the color subcarrier of the new material inserted into the video stored in the recirculating loop be the same as that of the stored video signal or otherwise the chroma in the update information will be lost. While in theory the system of FIG. 4 could be made to have the capability of applying update information to the recirculating loop on every frame of the incoming video by inverting the chrominance component of the update information before it is put into the recirculating loop; this approach would unnecessarily complicate the system and, moreover, a more pleasing and graphic display is obtained if the comparisons between incoming video and the video stored in delay device 54 are made less frequently. For example, if Frame No. 1 of a television field is stored as the reference frame and no updating is done until Frame No. 3 occurs, the color subcarrier of Frame No. 3 will have the same phase as in Frame No. 1 and the update information from Frame No. 3 can therefore be added to the recirculating loop without concern for possible chroma phase differences between the stored and update information. Thus, in this example, comparisons between stored and incoming video would be made on the third, fifth, seventh, ninth, etc. frames of the incoming video and any detected motion would cause update information to be inserted into the recirculating loop at the position determined by the successive positions of the moving object. In situations where the speed of the moving object is relatively slow, it is usually preferable to insert update information less frequently than every other frame of incoming video. For example, the relatively slow velocity of a putted golf ball can be very effectively displayed by inserting update information in only one frame out of four, or even a greater number of frames removed from the reference frame, so as to provide a definite spacing between successive display positions of the moving object. So as to be able to accommodate to a variety of velocities of motion of the moving object, the system of FIG. 4 is provided with a "Sampling Rate Enable" control on line 48 which, in effect, is a logic level that provides an override control of multiplexer 34 to preset the motion update rate, at the election of the operator, at either every second, fourth, sixth, or eighth, (or any other even number) frame of the incoming video. From what has been said earlier, whichever sampling rate is selected, the update information will have the correct chroma phase and will be inserted as a new picture element or elements in the frame store 38 previously occupied by corresponding reference picture elements. In the case of a golf ball being putted on a green, such successive updates will, in effect, replace grass in the static scene with a white ball.

Although the system of FIG. 4 has been described in terms of storing a reference frame of video information in delay devices 38 and 54, in a system that has been successfully operated these delay devices are designed to store a frozen field which is then interlaced with itself. It has long been known that stop action is generally unacceptable if a true frozen frame of two fully interlaced fields is displayed, the reason being that the temporal juxtaposition of two fields separated in time, and thus in position, particularly when the motion is relatively fast, causes what is known as "interfield flutter." This disturbing effect to the viewer is overcome by interlacing a field with itself, and is employed to advantage in the present system by substituting for delay devices 38 and 54 the delay apparatus illustrated in FIG. 4 of the aforementioned co-pending application. Briefly, it includes a first delay device having a delay of 262H, the output of which is applied to the input of a second delay device having a delay of 1H. The output terminals of the two delay devices are connected to respective inputs of a multiplexer which alternately selects the output from the two delay devices under control of the vertical sync of the television signal. Thus, in the present FIG. 4 system, the signal from multiplexer 34 would be alternately delayed by either 262H or 263H, with the change of delay occurring every field. This means that every second field the sum of the delays in the recirculating loop will be 262H plus 263H, or 525H, which is the equivalent of the delay provided by delay device 38. It will be evident that when "START" line 44 is turned "ON", a reference field is coupled into the recirculating loop by virtue of the just-described action of the two-delay device arrangement; the captured field is for all practical purposes interlaced with itself thereby eliminating interfield flutter in fast moving imagery. The system effectively ignores the separate 262H and 263H delays by allowing multiplexer 34 to respond on every fourth field, or every eighth field, or every twelfth field, such that detected differences between the stored self-interlaced field in delay 54 and subsequently arriving incoming field of the same sense will be substituted in the video stored in delay 38 only at those times; thus, instead of making comparisons every second, fourth, sixth, etc., frame as described above, since the described alternative delay apparatus effectively produces a delay of two frames every four fields, preferably the earliest update would be made on the fourth field following seizure of the stored self-interlaced field, and depending upon the desired frequency of update, comparisons could be made every fourth, eighth, twelfth, etc. field, with provisions made always to compare incoming fields of the same sense as the one stored in the recirculating loop. In similar manner, one may update every even-numbered field (which would be equivalent to an integral number of frames) provided provision is made for chroma phase correction of the stored video when the even number of fields is not integrally divisible by four.

Figure 5:
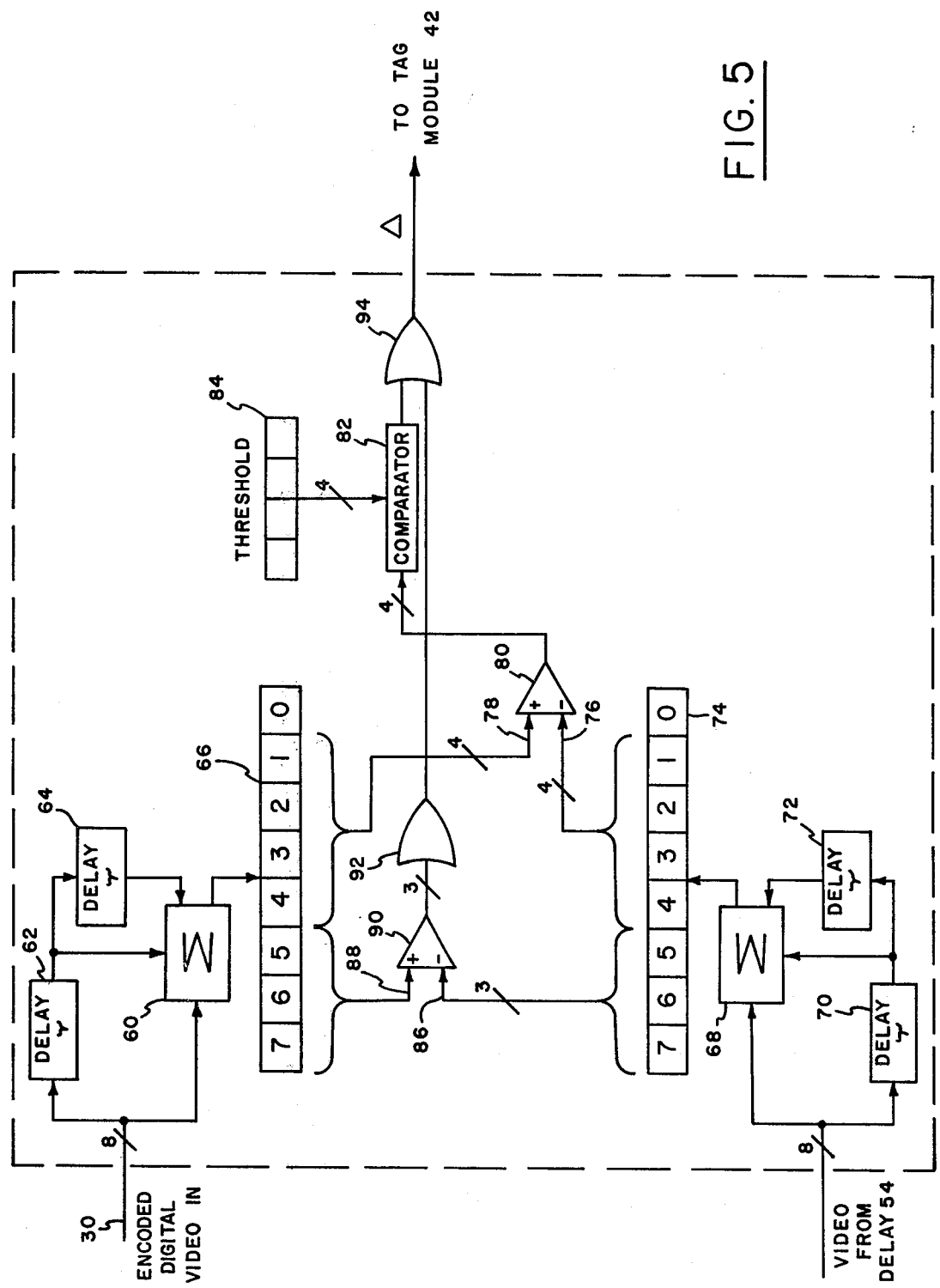
FIG. 5 is a functional block diagram of a circuit useful in the system of FIG. 4 for sensing relative motion between a stored and subsequently arriving video frames.

Although motion between the frame stored in delay device 54 and selected frames of the incoming video can be detected in a variety of ways, the digital system functionally illustrated in FIG. 5, and which is more fully described in commonly assigned co-pending application Ser. No. 881,284 filed Feb. 27, 1978, is particularly suitable. The incoming video signal is received on line 30 as an 8-bit PCM encoded signal which, includes both luminance and chrominance components. This signal is applied to a summer 60 and also to the input of a delay device 62 having a delay of $\tau$. The output from delay device 62 is applied as a second input to summer 60 and also to the input of a second delay device 64 also having a delay $\tau$, the output of which is applied as a third input to summer 60. The output of summer 60, an 8-bit PCM encoded signal, is applied to a suitable register, schematically shown at 66, which receives the individual bits of each word, the elements of which being labelled "0" for the least significant bit and "7" for the most significant bit.

Delay devices 62 and 64 each introduce a delay equal to one clock cycle of the system which, if the PCM technique described in U.S. Pat. No. 3,946,432 is utilized, is one-third the period of the color subcarrier signal, or approximately 93 nanoseconds. The delay of each device is related to the sampling rate utilized in the PCM encoding and, therefore, may have a delay equal to some other fraction, for example one-fourth of the period of the color subcarrier, if the sampling rate is $4f_{sc}$, in which case four samples would be added in summer 60, instead of three. Thus, summer 60 adds, on a picture element-by-picture basis, an undelayed video signal appearing on line 30, the input video signal delayed by $\tau$, and the input video signal delayed by $2\tau$. This sum is divided by an integer, such as three, in summer 60, whereby the output of summer 60 is a running average of three consecutive picture elements. The exact value of the integer by which the sum is divided is unimportant, and in an embodiment that has been successfully operated the sum is divided by four because it is easier in a digital system to divide by four than by three. The summation and averaging function is a transversal filter, the response characteristic of which has a notch that eliminates the 3.58 MHz color subcarrier from the signals applied to register 66. With the elimination of the color subcarrier, chrominance phase noise bursts inherent in multi-generation video tape recordings are thus also eliminated, thereby precluding their being mistaken for motion in the comparison process.

The stored video from delay device 54 (also 8-bit PCM encoded) is similarly filtered by another circuit including a summer 68 to which undelayed stored video is applied as one input, a delay device 70 for delaying the stored video by $\tau$ and a second delay device 72 for again delaying the stored video by $\tau$ and applying it as a third input to the summer. The output signal from the summer, which has substantially no chrominance component, is applied to a "register" 74, the elements of which are also labelled "0" to "7", to represent the least and most significant bits, respectively.

In order to detect motion, the filtered luminance component of the video from delay device 54 is compared element-by-element with the filtered luminance component of the incoming video signal. That is, the 8-bit word that represents the amplitude of the arriving video signal. In the illustrated embodiment, the least significant bit is discarded in both cases, and because it was recognized that wide differences could not be tolerated, two levels of comparison are employed. More specifically, bits 1, 2, 3 and 4 of the words representing the luminance component of stored and arriving video are applied to the −and +input terminals 76 and 78, respectively, of a difference amplifier 80, the output from which is a 4-bit word representative of the difference, if any, between the stored video and the arriving signal. The 4-bit word from the difference amplifier is applied to a comparator 82 which compares it to a 4-bit threshold or reference number, schematically illustrated at 84, of preset value greater than zero. When the difference in the output of difference amplifier 80 exceeds the threshold number, comparator 82 produces an output signal which is applied to a first input of an OR circuit 94, which produces an output signal, Δ, which in turn, is applied to tag module 42.

To take care of the possibility of there being no difference in bits 1–4 of the stored and arriving signal, yet a large difference actually existing between them which shows up in the more significant bits, a second comparison is made between bits 5, 6 and 7 of the stored video and the corresponding bits of the arriving video. To this end, the three most significant bits of the stored and incoming video are applied to the −and +input terminals 86 and 88, respectively, of a second difference amplifier 90, the 3-bit word output of which is applied to respective inputs of an OR circuit 92. When the difference amplifier 90 detects a difference between any one of the three most significant bits of the stored and arriving video, indicating that there is motion between them, OR circuit 92 applies a signal to a second input of OR circuit 94 which, in turn, applies an output signal, Δ, to tag module 42. Thus, a Δ signal is produced when (1) there is any difference between corresponding ones of the three most significant bits of the stored and arriving video signals, or (2) the difference between corresponding ones of four less significant bits of the stored and arriving video signals exceeds a preselected threshold value.

It will be recognized from the foregoing description that the origin of the video signal, provided it has the characteristics of the conventional NTSC color television signal, does not affect its operation; that is, the incoming video may be derived from a color television camera, from a video tape recorder, from a slow motion reproducer, or from telecine apparatus. Thus, it is convenient to use in a "live" telecasting environment, such as the telecasting of a sports event, and if the operator should have missed telecasting a particular event when it occurred, he can later take the signal from a video tape recorder and display the motion track of a moving object.

Although the invention has been described as applied to the NTSC system of color television, it is obviously directly applicable to monochrome television, and, indeed, in this environment would have particular utility in closed circuit systems for industrial process control, or in the making of training tapes for teaching the steps of an assembly process, for example. Also, with relatively minor modification in the circuitry for handling the color component, the invention is equally applicable in other known color television systems, such as PAL and SECAM. Thus, while the invention has been described with reference to a specific preferred embodiment, along with suggested modifications to adapt it to other applications, it is intended that such modifications, and others that will now be apparent to ones skilled in the art, be encompassed by the following claims.

I claim:

1. Method for generating a video signal for displaying simultaneously a succession of images of an object moving over a selectable time period in an otherwise substantially static scene, comprising the steps of:
   (a) storing for the duration of a selected time period a reference frame of video representing said scene at the start of a selected time period;
   (b) comparing picture elements of selected television frames subsequently arriving during the selected time period with corresponding picture elements of the said reference frame;
   (c) separately storing those picture elements of the subsequently arriving frames which are shown by the comparison to be different from those in said reference frame and assigning to the later value for a picture element separately stored priority over an earlier separately stored value derived during the selected time period for the same picture element; and (d) at the termination of the selected time period, providing a video signal for display representing at least those picture elements separately stored during the selected time period.

2. Method for generating a video signal for displaying simultaneously a succession of images of an object moving over a selectable time period in an otherwise substantially static scene, comprising the steps of:

(a) storing for the duration of a selected time period a reference frame of video representing said scene at the start of a selected time period;

(b) comparing picture elements of selected time-separated television frames subsequently arriving during the selected time period with corresponding picture elements of said reference frame;

(c) separately storing those picture elements of the subsequently arriving frames shown by the comparison to be measurably different from those in the said reference frame, and assigning to the later value for a picture element separately stored priority over an earlier separately stored value derived during the selected time period for the same picture element; and (d) at the termination of the selected time period, providing an output video signal comprising said reference frame with the substitution therein of the picture elements of the subsequently arriving frames which are different from those in the reference frame and which are separately stored during the selected time period.

3. Apparatus for generating from arriving television signals, video signals for displaying simultaneously a succession of images of an object moving over a selectable time period in an otherwise substantially static scene, said apparatus comprising:

first storage means for storing during the duration of a selected time period a reference frame of video representing a scene at the start of the selected time period;

means for comparing picture elements of selected television frames subsequently arriving during the selected time period with corresponding picture elements of said reference frame;

means including second storage means for separately storing those picture elements of the selected subsequently arriving frames shown by the comparing means to be measurably different from corresponding picture elements in the reference frame and for assigning to the later value for a picture element separately stored priority over an earlier separately stored value derived during the selected time period for the same picture element; and means coupled to said second storage means for providing at the termination of said selected time period a video signal for display representing at least those picture elements separately stored during said selected time period, the separately stored picture elements providing in the display successive images of said moving object with later images taking precedence over earlier images in the case of overlap of successive images.

4. Apparatus according to claim 3, wherein said apparatus further comprises operator-controllable means for controlling the start and termination of said selectable time period.

5. Apparatus according to claim 3, wherein said arriving television signals are digitally encoded, and wherein at least said first storage means is a digital frame store.

6. Apparatus according to claim 5, wherein said first and second storage means each comprise a digital frame store.

7. Apparatus according to claim 5, wherein said digital frame store comprises first and second storage devices respectively capable of storing 262H and 1H, where H is the period of one television line, connected in series, and means for multiplexing the outputs of said first and second storage devices in response to the vertical sync of said television signals to derive the equivalent of a digital frame store.

8. Apparatus according to claim 5, wherein said arriving television signals are color video signals having luminance and chrominance components;

wherein said comparing means is operative to compare picture elements of subsequently arriving frames time-displaced from said stored reference frame each by an odd number of television frames with corresponding picture elements of said reference frame; and wherein said apparatus further comprises means for modifying the chrominance component of the picture elements stored in said second storage means so as to be in correct phase relationship to be added to the chrominance component of the arriving color video signal.

9. Apparatus according to claim 8, wherein said arriving television signals are 8-bit PCM encoded NTSC color video signals, and wherein said first and second storage means each has a delay period of substantially 525H, where H is the period of one horizontal television line.

10. Apparatus according to claim 3, wherein said apparatus further comprises means operative during the said selected period for coupling the arriving video signal to the said second storage means only when the arriving picture element differs from the signal stored in the first storage means for the same picture element, whereby the second storage means contains signals for only the picture elements which, during the selected time period, have differed from the reference frame stored in the first storage means.

11. Apparatus according to claim 3, wherein the said second storage means is a frame store connected in a loop in which the stored video information is recirculated, and wherein said apparatus further comprises means for applying an identifying signal element to a picture element signal which is separately stored in the second storage means, means for applying the arriving video signal to an output line, and means for inserting the picture element signals separately stored in the second storage means into the video signal applied to the output line in response to the said identifying signal element.

12. Apparatus according to claim 11, wherein the second storage means is loaded, at the start of the selected time period, with binary digital values for all picture elements of the existing video frame, but with all LSB's having one of the two binary values, and wherein subsequently stored picture elements have their LSB's made equal to the other of the two binary values, the value of the LSB constituting the said identifying signal element.

13. Apparatus according to claim 11 or claim 12, wherein at least the first storage means is a digital frame store for storing digitally encoded arriving television signals.

14. Apparatus according to claim 13, wherein the first and second storage means each comprise a digital frame store.

15. Apparatus for generating from arriving television signals, video signals for displaying simultaneously a succession of images of an object moving over a selectable time period in an otherwise substantially static scene, said apparatus comprising:

first storage means for storing during the duration of a selected time period a reference frame of video representing a scene at the start of the selected time period;

means for comparing picture elements of selected television frames subsequently arriving during the selected time period with corresponding picture elements of said reference frame;

means including second storage means for separately storing and assigning to later-arriving picture elements of the selected subsequently arriving frames shown by the comparing means to be different from corresponding picture elements in the reference frame priority over an earlier stored value derived during the selected time period for the same picture element; and means coupled to said second storage means for providing at the termination of said selected time period a video signal for display representing at least those picture elements separately stored during said selected time period, the separately stored picture elements providing in the display successive images of said moving object, with later images taking precedence over earlier images in the case of overlap of successive images.

16. Method for generating a video signal for displaying simultaneously a succession of images of an object moving over a selectable time period in an otherwise substantially static scene, comprising the steps of:

(a) storing for the duration of a selected time period a reference frame of video representing said scene at the start of a selected time period;

(b) comparing picture elements of selected television frames subsequently arriving during the selected time period with corresponding picture elements of the reference frame;

(c) separately storing and assigning to later-arriving picture elements of the selected subsequently arriving frames shown by the comparison to be different from corresponding picture elements in the reference frame priority over an earlier-stored value derived during the selected time period for the same picture elements; and (d) at the termination of the selected time period, providing a video signal for display representing at least those picture elements separately stored during the selected time period.

* * * * *